INVENTOR.
Richard L. Wilson
BY
*A. A. Steinmiller*
Attorney

INVENTOR.
Richard L. Wilson

United States Patent Office 3,175,871
Patented Mar. 30, 1965

3,175,871
CONTINUAL QUICK SERVICE VALVE DEVICE
Richard L. Wilson, Trafford, Pa., assignor to Westinghouse Air Brake Company, Wilmerding, Pa., a corporation of Pennsylvania
Filed Oct. 11, 1963, Ser. No. 315,435
11 Claims. (Cl. 303—82)

This invention relates to fluid pressure brake apparatus for railway cars and the like, and more particularly to a novel type of "continual" quick service valve device which is operative repeatedly with each successive brake pipe pressure reduction over the entire service application range of brake pipe pressure reductions to effect "quick service" transmission through the brake pipe of a pressure reduction wave.

At the time the familiar "AB" air brake control valve device came into general use on American railroads over thirty years ago, the length of freight cars did not exceed sixty feet. Present day freight cars that are conventionally equipped with the familiar "AB" air brake control valve device vary from approximately thirty to ninety feet in length. Since the brake pipe to which the "AB" air brake control valve device is connected extends from end to end of the car, it is apparent that the volume of the brake pipe on the longest cars being built today exceeds by at least fifty percent the volume of the brake pipe of older cars. Therefore, it is desirable to effect greater local quick service reductions in brake pipe pressure than has been heretofore possible with the standard "AB" freight car brake equipment now in use on most American railroads in order to assure a higher rate of propagation of a brake pipe pressure reduction wave from the locomotive backward through the train and thereby effect a more nearly simultaneous initiation of a service application of brakes on all cars in a train.

Furthermore, the present standard freight car "AB" air brake control valve device is operable to provide a local quick service reduction in brake pipe pressure only in response to the initial reduction in brake pipe pressure effected by manual operation of the engineer's brake valve device located on the locomotive.

Under certain service conditions, for example, when a freight train having cars equipped with the conventional "AB" control valve device must descend a long and increasingly steep grade, it is necessary for the engineer to make an initial light reduction in brake pipe pressure and one or more subsequent heavier reductions in order to provide the proper degree of braking on the train as it descends the grade.

Therefore, it would be most desirable that each car in the train be provided, in addition to the conventional "AB" control valve device, with an improved quick service valve device for effecting "continual" (that is, interrupted but repeated) limited quick service reductions in brake pipe pressure.

It is the general purpose of this invention to provide a novel quick service valve device for use with an "AB" brake control valve device in a railway freight car brake control equipment, which quick service valve device is operative to effect "continual" limited quick service reductions in brake pipe pressure, that is, repeated quick service reductions in brake pipe pressure whenever and so long as brake pipe pressure is being reduced at a service rate by manual operation of the engineer's brake valve device on the locomotive. By using a quick service valve device with an "AB" brake control valve device, greater overall quick service reduction in brake pipe pressure can be effected, without causing an undesired emergency application of brakes, that can be effected with the "AB" brake control valve device alone. Also, the local quick service reductions in brake pipe pressure will be effected not only upon an initial service rate of reduction in brake pipe pressure, but also upon successive further service reductions in brake pipe pressure effected to apply brakes to correspondingly greater degrees, such as while descending a grade.

According to this invention, a novel quick service valve device is provided for use in combination with an "AB" brake control valve device, which novel quick service valve device is responsive to each successive service rate of reduction in brake pipe pressure to provide repeated quick service reductions in brake pipe pressure upon each and every service reduction following an initial reduction effected by the engineer's brake valve device.

More particularly, according to the present invention, a novel quick service valve device is provided which embodies therein a quick service valve means operative by a diaphragm or piston subject to brake pipe pressure present in a chamber on one side thereof and to pressure of fluid in a quick service chamber on the opposite side, the quick service chamber having a restricted communication with the brake pipe. The quick service valve means is operative by the diaphragm in response to a reduction in brake pipe pressure at a service rate in the one chamber to first effect, at a restricted rate, a local quick service venting of fluid under pressure from the one chamber and the brake pipe to atmosphere, or to a quick service volume and to atmosphere, until a sufficient differential of pressure is established on the diaphragm to further deflect the diaphragm, which has a lost motion connection with a quick service chamber vent valve, sufficiently to sequentially effect operation of the quick service chamber vent valve to cause venting of fluid under pressure at a more rapid rate from the quick service chamber to atmosphere until the pressure therein is reduced below that of the reduced brake pipe pressure present in the one chamber. The lost motion connection between the diaphragm and the quick service chamber vent valve enables this valve to effect the reduction of pressure in the quick service chamber a slight interval of time after the diaphragm has been initially deflected to effect the local quick service venting of fluid under pressure from the brake pipe. Therefore, when the pressure in the quick service chamber on the opposite side of the diaphragm has been reduced to a valve slightly less than the reduced brake pipe pressure present on the one side of the diaphragm, a differential of pressure will be established on the diaphragm to deflect it in the direction to first effect closing of the quick service valve means to terminate flow of fluid under pressure from the brake pipe to atmosphere, or to the quick service volume and atmosphere, and to subsequently effect closing of the quick service chamber vent valve to cut off flow of fluid under pressure from the quick service chamber to atmosphere.

DESCRIPTION—FIG. 1

Figure 1:
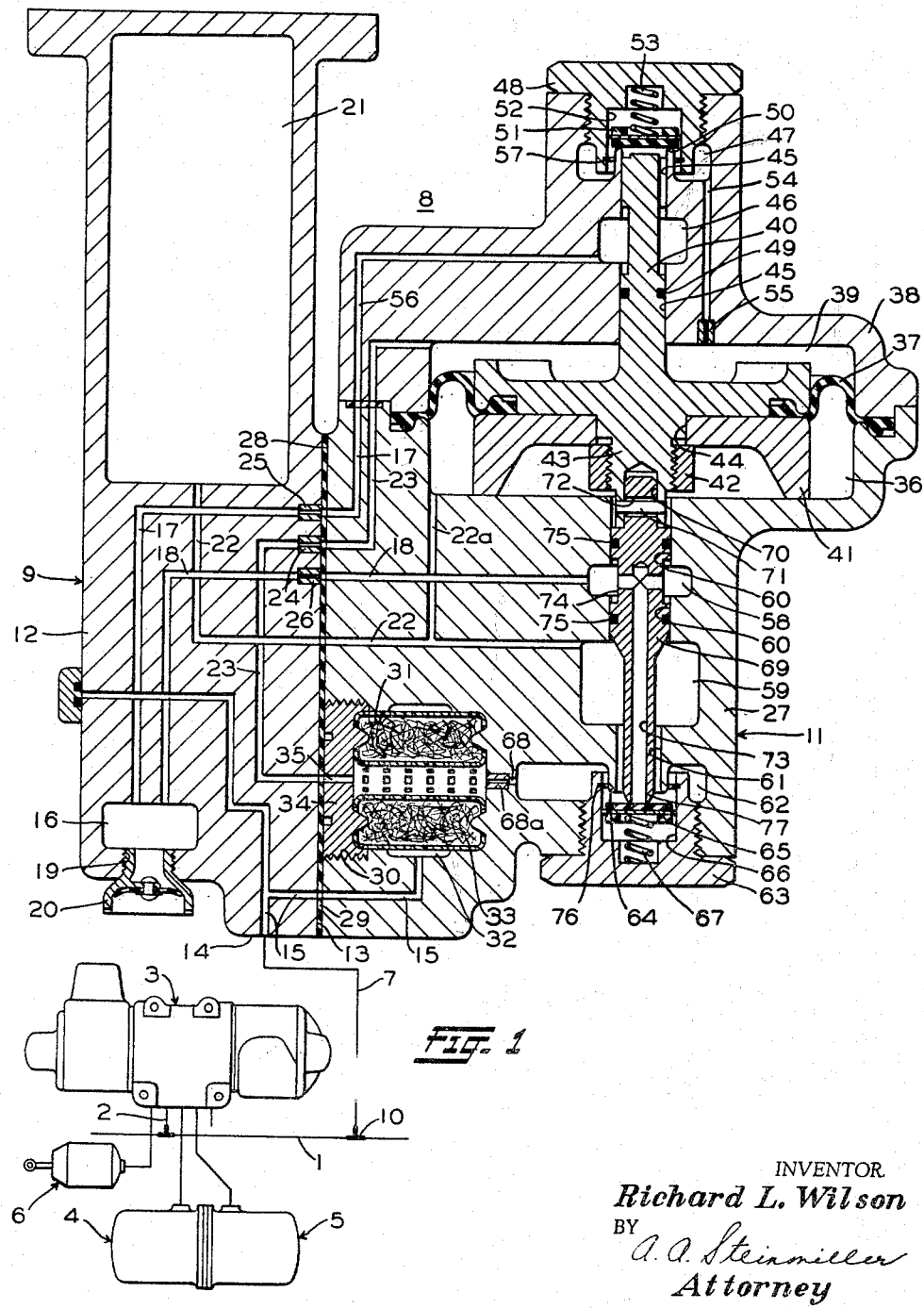
FIG. 1 is a diagrammatic view, partly in section, showing a brake control system for a railway freight car embodying the invention and comprising the well-known "AB" brake control valve device and a novel quick service valve device.

In FIG. 1 the fluid pressure brake equipment shown comprises a brake pipe 1, a first branch pipe 2, a brake control valve device 3, an auxiliary reservoir 4, an emergency reservoir 5, a brake cylinder device 6, a second branch pipe 7 and a quick service valve device 8.

The brake control valve device 3 may be of the direct release type, such as the well-known "AB" valve device which is fully described in United States Patent 2,031,-213, issued February 18, 1936 to Clyde C. Farmer and assigned to the assignee of the present application.

In view of the above-mentioned patent, it is deemed unnecessary to show and describe in detail the brake control valve device 3 and the brake cylinder device 6. It will, of course, be understood that the brake control device 3 operates upon a service reduction in brake pipe pressure to supply fluid under pressure to the brake cylinder device 6 to effect a service application of the brakes, upon an emergency reduction in brake pipe pressure to effect an emergency application of the brakes, and upon an increase in brake pipe pressure to effect the full release of the brakes and the charging of the brake equipment. It will also be understood that the brake cylinder device 6 is effective to apply to the wheels of a freight car a braking force proportional to the pressure of fluid supplied to said brake cylinder device by the brake control valve device 3.

The quick service valve device 8 comprises a pipe bracket portion 9 to which one end of the second branch pipe 7 is connected, the opposite end being connected to the outlet of a pipe T 10 disposed in the brake pipe 1, and a quick service valve mechanism 11 secured to the pipe bracket portion 9 by any suitable means (not shown).

The pipe bracket portion 9 comprises a casing 12 that is provided on one side with a vertical bolting face 13 to which is secured by any suitable means (not shown) the quick service valve mechanism 11.

Extending from the vertical bolting face 13 of the casing 12 through the casing and opening at a flat surface 14 on the lower side of the casing and at right angles to the bolting face 13 is a port and passageway 15 to which the one end of the second branch pipe 7 is connected. Also opening at the surface of the vertical bolting face 13 and extending therefrom through the casing 12 and opening into an exhaust chamber 16 wherein are two other ports and passageways 17 and 18. Opening into the exhaust chamber 16 is a screw-threaded bore 19 that extends from the exterior of the casing 12 into the exhaust chamber, and screw threaded into this screw-threaded bore is an insect excluder device 20 which is so constructed as to allow the free flow of fluid under pressure from the exhaust chamber 16 to atmosphere and prevent the entrance of insects or dirt particles from the atmosphere into the exhaust chamber 16. Extending through the casing 12 and opening respectively at the vertical bolting face 13 and into a quick service chamber 21 formed in the casing 12 is a fourth passageway 22.

Furthermore, extending through the casing 12 and opening at each end at the vertical bolting face 13 is a fifth passageway 23 that has therein, at one end and adjacent the bolting face 13, a choke 24.

The passageways 17 and 18 in the casing 12 have respectively therein, adjacent the bolting face 13, chokes 25 and 26 which, respectively, control the rate at which fluid under pressure is vented from the brake pipe 1 to atmosphere, and the rate at which fluid under pressure is vented from the quick service chamber 21 to atmosphere.

The quick service valve mechanism 11 comprises a casing 27 that is provided on one side thereof with a vertical bolting face 28 that corresponds to the bolting face 13 of the pipe bracket casing 12, in that opening at the surface of the bolting face 28 are ports corresponding to and registering with the ports 15, 17, 18, 22 and the ports at each end of the passageway 23, these ports being identically arranged therein and opening from corresponding passageways in the casing 27 so that when a gasket 29, provided with ports therein corresponding in number and arrangement to the ports opening at the respective surfaces of bolting faces 13 and 28, is placed between these two bolting faces and the casing 27 is rigidly secured to the casing 12 of the pipe bracket portion 9 by bolts or other similar means (not shown), the passageways 15, 17, 18, 22 and one end of the passageway 23 in the casing 12 extend into corresponding passageways in the casing 27.

The casing 27 also has opening at the surface of the bolting face 28 a screw-threaded counterbore 30 that is coaxial with a counterbore 31 that opens into a chamber 32 in which is contained a strainer device 33 which is inserted through the left-hand open end of the bore 31 prior to securing the strainer device 33 in place by a nut 34 that is screw threaded into the counterbore 30 and also prior to securing the casing 27 to the casing 12. Such a strainer device is described and claimed in Patent No. 2,014,825, issued September 17, 1935 to Ellis E. Hewitt, which patent is assigned to the assignee of the present application. Briefly, however, the strainer device comprises two concentric perforated tubular retainers having the space therebetween packed with hair or any other material suitable for separating dirt, moisture or the like from a stream of fluid under pressure. The inner surface of the smaller of the two concentric retainers defines a passageway which is open to the port and passageway 23 in the casing 12 through a passageway 35 in the nut 34. The passageway 15 that extends through the casings 12 and 27 opens into the chamber 32.

The passageway 22 in the casing 27 has a branch passageway 22a that opens into a chamber 36 that is formed in the casing 27 below a flexible diaphragm 37 which is rigidly clamped about its periphery between the casing 27 and a cover member 38 which is secured to the casing 27 by any suitable means (not shown). The diaphragm 37 and the cover member 38 cooperate to form above the diaphragm a chamber 39 into which opens a passageway, the opposite end of which opens at the surface of the face of the cover member 38 that abuts the casing 27 in such a location as to be in alignment with the passageway 23 in the casing 27.

The diaphragm 37 has its inner periphery operatively connected to a valve stem 40 having at one end a flange that is clamped against a diaphragm follower 41 by a nut 42 that has screw-threaded engagement with corresponding screw threads formed on a stem 43 that is integral with the valve stem 40 and extends through a bore 44 formed in the diaphragm follower 41.

The valve stem 40 is slidably mounted in a bore 45 that is provided in the cover member 38 and extends from the chamber 39 through a chamber 46 formed in the cover member 38 to a chamber 47 formed by the cooperative relation of the cover member 38 and a threaded cap nut 48 that has screw-threaded engagement with a corresponding screw-threaded bore formed in the cover member 38 and extending from the exterior of the cover member into the chamber 47.

An O-ring seal 49 is carried in a peripheral annular groove formed in the valve stem 40 below a portion of reduced diameter that extends through the chamber 46 to a fluted portion of the valve stem 40 that is slidably mounted in that portion of the bore 45 that connects the chamber 46 to the chamber 47. An annular valve seat 50 is formed at the upper end of the bore 45 against which a flat disc valve 51, slidably disposed in a counterbore 52 formed in the cap nut 48, is normally biased by a spring 53 interposed between the flat disc valve 51 and the cap nut 48 to close communication between the chamber 47, which is connected to the chamber 39 above the diaphragm 37 via a passageway 54 formed in the cover member 38 and a choke 55 disposed in the passageway 54, and the chamber 46 into which opens one end of a passageway 56 in the cover member 38, the opposite end of which passageway opens at the surface of the cover member 38 that abuts the casing 27 and registers with one end of the passageway 17 in the casing 27.

To facilitate assembly and disassembly of the cap nut 48, spring 53 and flat disc valve 51 as a unit, the spring 53 and flat disc valve 51 are retained in the counterbore 52 in the cap nut by a snap ring 57 that is inserted in a groove formed in the wall of the counterbore 52.

Formed in the casing 27 are two chambers 58 and 59 that are connected by a bore 60 that also connects the chamber 36 below the diaphragm 37 to the chamber 58. Opening into the chamber 58 is one end of the passageway 18 that extends through the casings 27 and 12 and opens at its opposite end into the exhaust chamber 16 so that the chamber 58 is constantly open to atmosphere via the passageway 18, choke 26 disposed in the passageway 18, exhaust chamber 16 and insect excluder device 20. Opening into the chamber 59 is one end of the passageway 22 that extends through the casings 27 and 12 and opens at its opposite end into the quick service chamber 21. Also opening into the chamber 59 is one end of a bore 61 that is coaxial with the bore 60 and opens at its other end into a chamber 62 formed by the cooperative relation of the casing 27 and a threaded cap nut 63 that has screw-threaded engagement with a corresponding screw-threaded bore formed in the casing 27 and extending from the exterior thereof into the chamber 62.

Formed at the lower end of the bore 61 is an annular valve seat 64 toward which a flat disc valve 65, slidably disposed in a counterbore 66 formed in the cap nut 63, is biased by a spring 67 interposed between the flat disc valve 65 and the cap nut 63.

The chamber 62 is connected via a passageway 68 having a choke 68a therein to the passageway defined by the inner surface of the smaller of the two concentric retainers of the strainer device 33 so that the chamber 62 is constantly supplied with fluid under pressure from the brake pipe 1 via pipe T 10, branch pipe 7, passageway 15 in the casings 12 and 27, chamber 32, strainer device 33, choke 68a and passageway 68.

The diaphragm 37 is operatively connected by means of a lost-motion connection to a spool type valve 69 that is slidably mounted in the bore 60 formed in the casing 27. The lost-motion connection is constituted by the upper end of the spool type valve 69 which is of reduced diameter, being disposed in a counterbore 70 formed in the stem 43 and connected thereto by a pin 71 extending through a bore 72 of larger diameter than the pin that is formed in the upper end of the spool type valve 69, the pin 71 having its opposite ends anchored in the stem 43.

The spool type valve 69 has at its lower end a portion of reduced diameter that extends downward through the chamber 59 and bore 61 so as to hold the flat disc valve 65 away from the annular valve seat 64 while the diaphragm 37 occupies the position in which it is shown in FIG. 1, in which position the diaphragm follower 41 abuts the casing 27.

Extending upward from the lower end of the spool type valve 69 is a counterbore 73, the top of which is connected by a cross-drilled port to a peripheral annular groove 74 provided intermediate the ends of the spool type valve 69 and so located that the cross-drilled port opens into the chamber 58. Located in the valve 69 adjacent the respective opposite ends of the peripheral annular groove 74 are two spaced-apart peripheral annular grooves in each of which is disposed an O-ring seal 75 which prevents flow of fluid under pressure from the chambers 36 and 59 to the chamber 58 which is constantly open to atmosphere via passageway 18, choke 26, exhaust chamber 16 and insect excluder device 20.

To facilitate assembly and disassembly of the cap nut 63, spring 67 and flat disc valve 65 as a unit, the spring 67 and flat disc valve 65 are retained in the counterbore 66 in the cap nut by a snap ring 76 that is inserted in a groove formed in the wall of the counterbore 66.

OPERATION—FIG. 1

*Initial charging*

Let it be assumed that a railway freight car provided with the control valve device 3 and the quick service valve device 8, shown in FIG. 1 of the drawings, has been coupled into a train of cars, and that a handle of an engineer's brake valve device (not shown) located on the locomotive coupled to the head end of the train is in its "Release" position. Therefore, while the handle of the engineer's brake valve device is in its "Release" position, the engineer's brake valve device will effect the supply of fluid under pressure to the train brake pipe and therefore to the brake pipe 1 to charge the brake pipe to a preselected normal charge value which, for example, may be 70 pounds per square inch.

Fluid under pressure supplied to the brake pipe 1 will cause the brake control valve device 3 to operate in the usual well-known manner to effect a release of the brakes on the car and to charge the auxiliary reservoir 4 and the emergency reservoir 5.

Fluid under pressure supplied to the brake pipe 1 will flow therefrom to the chamber 39 above the diaphragm 37 of the quick service valve device 8 via pipe T 10, branch pipe 7, passageway 15, chamber 32, strainer device 33, passageway 35, passageway 23 and choke 24 to charge the chamber 39 to the hereinbefore-mentioned preselected normal charged value.

Fluid under pressure supplied to the chamber 32, as explained above, will flow therefrom to the quick service chamber 21 via the strainer device 33, choke 68a, passageway 68, chamber 62, then past flat disc valve 65 which is unseated from the annular valve seat 64 and thence through the bore 61, chamber 59 and passageway 22 to also charge the quick service chamber 21 at a rate controlled by the size of the choke 68a to the hereinbefore-mentioned preselected normal charged value.

Since the chamber 36 below the diaphragm 37 is connected to the quick service chamber 21 via branch passageway 22a and the passageway 22, the chamber 36 also will be charged to the hereinbefore-mentioned preselected normal charge value.

The size of the choke 68a is less than that of the choke 24. This insures that the chamber 39 will charge faster than the chamber 36 so that the flat disc valve 65 is maintained unseated from the annular valve seat 64 during initial charging. However, when the chambers 39 and 36 are both fully charged to the hereinbefore-mentioned preselected normal charged value, it being understood that the chamber 36 is fully charged a slight interval of time after the chamber 39 is fully charged, the spring 67 is rendered effective to move the flat disc valve 65, spool type valve 69, stem 43, diaphragm 37 and valve stem 40 upward until the flat disc valve 65 is moved into contact with the annular valve seat 64 to close communication between the chambers 59 and 62. It will be understood that the length of the valve stem 40 is such that this upward movement of the valve stem 40 occurs without the upper end of the valve stem 40 unseating the flat disc valve 51 from the annular valve seat 50. Therefore, the spring 53 is effective to bias the flat disc valve 51 into contact with the annular valve seat 50 to close communication between the chambers 47 and 46. While the flat disc valve 51 is seated on the annular valve seat 50, the chamber 47 is charged from the brake pipe 1 to the hereinbefore-mentioned preselected normal charged value via pipe T 10, branch pipe 7, passageway 15, chamber 32, strainer device 33, passageway 35 in nut 34, passageway 23, choke 24, chamber 39 above the diaphragm 37, choke 55, and passageway 54 at a rate controlled by the size of the chokes 24 and 55.

It will be noted that while the annular flat disc valve 51 is seated on the annular valve seat 50, the chamber 46 has a restricted communication with the atmosphere via passageway 56, passageway 17, choke 25, exhaust chamber 16 and insect excluder device 20. The chamber 58 also has a restricted communication with the atmosphere via passageway 18, choke 26, exhaust chamber 16 and insect excluder device 20.

FULL SERVICE APPLICATION OF BRAKES

Assume that the brake equipment shown in FIG. 1 of the drawings is the brake equipment on a freight car in a train of cars being hauled by a locomotive, and let it be supposed that the engineer desires to effect the full service brake application on the train.

To manually effect a full service application of brakes on a train, the engineer will move the handle of the engineer's brake valve device on the locomotive arcuately from its "Release" position to a "Full Service" position in a service zone.

When the handle of the engineer's brake valve device is moved to its "Full Service" position in the service zone, the brake valve device operates to vent fluid under pressure from the train brake pipe and therefore the brake pipe 1 to atmosphere at a service rate until the pressure in the train brake pipe is reduced to a corresponding degree.

As the pressure in the brake pipe 1 is reduced at a service rate, the brake control valve device 3 operates in the usual well-known manner to effect an initial quick service reduction in brake pipe pressure and a full service brake application on the freight car on which brake control valve device 3 is installed. Also, as the pressure in the brake pipe 1 is reduced by flow therefrom to atmosphere via the train brake pipe and the engineer's brake valve device on the locomotive, fluid under pressure will flow at a restricted rate from the chamber 39 above the diaphragm 37 of the quick service valve device 8 to the brake pipe 1 via passageway 23, choke 24, passageway 35 in the nut 34, strainer device 33, chamber 32, passageway 15 and branch pipe 7 so that the pressure in the chamber 39 is reduced simultaneously as the pressure in the train brake pipe is reduced at a rate controlled by the size of the choke 24.

As the pressure in the chamber 39 is reduced, the pressure retained in the chamber 36 below the diaphragm 37 and in the quick service chamber 21, since the flat disc valve 65 is now seated on the annular valve seat 64 and also on an annular valve seat 77 formed on the lower end of spool type valve 69 at the lower end of counterbore 73 therein, is effective to establish a differential of pressure on the diaphragm 37 which deflects it in an upward direction, and thereby through the intermediary of the valve stem 40 moves the flat disc valve 51 upward against the yielding resistance of the spring 53 to unseat it from the annular valve seat 50. By unseating of the flat disc valve 51, fluid under pressure from the brake pipe which is present in the chamber 47 is permitted to flow at a restricted rate determined by the size of chokes 24, 55 and 25 to atmosphere via bore 45, chamber 46, passageways 56 and 17, choke 25, exhaust chamber 16 and insect excluder device 20. The size of the chokes 24, 55 and 25 is such as to prevent the pressure in the brake pipe 1 being reduced at an emergency rate. Consequently, an emergency brake application is avoided.

The fluid under pressure vented from the brake pipe to the atmosphere, as explained above, continues at a rate determined by the size of the chokes 24, 55 and 25 until the venting of fluid under pressure from the brake pipe to atmosphere is terminated by seating of the flat disc valve 51 on the annular valve seat 50 in a manner now to be explained. Thus the quick service valve device 8 operates in response to a "Full Service" reduction in the pressure in the brake pipe 1 to vent fluid under pressure from the brake pipe 1 to atmosphere to provide a transmission wave of quick service reduction in brake pipe pressure serially from car to car through the train.

The initial quick service reduction in brake pipe pressure effected by a flow from the brake pipe 1 to atmosphere in response to unseating of the flat disc valve 51 is effective to further reduce the pressure in the chamber 39 above the diaphragm 37 since flow from the brake pipe 1 to atmosphere must be through the chamber 39. This further reduction in the pressure in the chamber 39 above the diaphragm 37 causes the higher pressure retained in the chamber 36 below the diaphragm 37 to deflect this diaphragm upward against the yielding resistance of the spring 53, since, as previously stated, the upper end of the valve stem 40 is in contact with the bottom of the flat disc valve 51.

As the diaphragm 37 is thus deflected upward, the stem 43 and the pin 71 carried thereby are likewise moved upward. Therefore, as soon as the pin 71 has been moved upward far enough to contact the wall of the bore 72 in the spool type valve 69, subsequent upward movement of the stem 43 and pin 71 is effective to move the spool type valve 69 upward so that the annular valve seat 77 formed on the lower end of the spool type valve 69 will be lifted upward from the flat disc valve 65 which is biased against the annular valve seat 64 by the spring 67.

When the annular valve seat 77 is lifted from the flat disc valve 65, fluid under pressure present in the chamber 36 and the quick service chamber 21 connected thereto by the passageway 22 and branch passageway 22a flows to atmosphere via passageway 22, chamber 59, bore 61, past the unseated annular valve seat 77 and thence via the counterbore 73, chamber 58, passageway 18 and choke 26 disposed therein, exhaust chamber 16 and insect excluder device 20 at a rate controlled by the size of the choke 26 which is of such a size as to provide for a more rapid flow of fluid under pressure from the chamber 36 than can occur from the chamber 39 via the chokes 55 and 25 in series.

Fluid under pressure will thus be vented from the quick service chamber 21 and the chamber 36 below the diaphragm 37 until the pressure in the chamber 36 is reduced sufficiently for the force of the spring 53 and the reduced brake pipe pressure present in the chamber 39 and acting above the diaphragm 37 to deflect the diaphragm 37 downward and move the valve stems 40 and 43 and flat disc valve 51 downward until the flat disc valve 51 contacts the annular valve seat 50 to cut off flow of fluid under pressure from the brake pipe and chambers 39 and 47 to atmosphere.

It will be noted that by reason of the lost-motion connection provided by the pin 71 between the stem 43 and the spool type valve 69, the above-mentioned downward movement of the valve stems 40 and 43 is relative to the spool type valve 69 which remains stationary, it being understood that the O-ring seals 75 provide enough friction with the wall of the bore 60 to prevent the spool type valve from being moved downward by gravity. Therefore, after the flat disc valve 51 has been moved into seating contact with the annular valve seat 50 to cut off flow from the brake pipe and chambers 39 and 47 to atmosphere, fluid under pressure will continue to flow from the quick service chamber 21 and the chamber 36 below the diaphragm 37 to atmosphere via branch passageway 22a, passageway 22, chamber 59, bore 61, past the annular valve seat 77, bore 73, chamber 58, passageway 18 and choke 26 therein, exhaust chamber 16 and insect excluder device 20 until the pressure in the chamber 36 has been sufficiently reduced below the reduced brake pipe pressure present in the chamber 39 to establish a differential of pressure on the diaphragm 37 to effect a downward deflection of this diaphragm to cause the stem 43 to move the spool type valve 69 downward until the annular valve seat 77 formed on the lower end of valve 69 contacts the upper side of flat disc valve 65 which is now biased by spring 67 into seating contact with annular valve seat 64.

Movement of the annular valve seat 77 into seating contact with the upper side of the flat disc valve 65 is effective to cut off further flow of fluid under pressure from the quick service chamber 21 and chamber 36 to atmosphere.

From the above, it is apparent that the diaphragm 37 is deflected upward in response to a reduction in brake pipe pressure present in the chamber 39 above the diaphragm 37 to first effect unseating of the flat disc valve 51 from its annular valve seat 50, without effecting movement of the spool type valve 69, to cause a quick service reduction in brake pipe pressure by flow of fluid under pressure from the brake pipe to atmosphere, and then to effect upward movement of the spool type valve 69 to lift the annular valve seat 77 on the lower end of this valve from the flat disc valve 65, which is biased by the spring 67 against the annular valve seat 64, to cause the pressure in the quick service chamber 21 and chamber 36 below the diaphragm 37 to be reduced substantially the same amount, that is, to the same pressure, as the pressure in the chamber 39 is reduced by operation of the engineer's brake valve device on the locomotive and the unseating of the flat disc valve 51 to cause a local quick service venting of fluid under pressure from the brake pipe 1 to atmosphere.

RELEASE OF A "FULL SERVICE" APPLICATION OF BRAKES

To effect a release of a "Full Service" application of brakes, the engineer will move the handle of the engineer's brake valve device on the locomotive from its "Full Service" position arcuately back to its "Release" position whereupon the engineer's brake valve device will effect the supply of fluid under pressure to the train brake pipe and therefore to the brake pipe 1 to charge the brake pipe to the hereinbefore-mentioned preselected normal charged value.

The fluid under pressure thus supplied to the brake pipe 1 will cause the brake control valve device 3 to effect a release of the brakes in the usual well-known manner.

Fluid under pressure supplied to the brake pipe 1 will now flow to the chambers 39 and 36 on the opposite sides of the diaphragm 37 in the manner described under initial charging to charge these chambers and the quick service chamber 21, which is connected to the chamber 36 by the passageway 22 and branch passageway 22a, to the hereinbefore-mentioned preselected normal charged value. When the chambers 39 and 36 are both charged to the same pressure, which is the hereinbefore-mentioned preselected normal charged pressure of the brake pipe, by reason of the fact that the area on the upper side of the diaphragm is less than that of the lower side by an amount equal to the area of the valve stem 40, a differential of pressure will be established which acts in the upward direction to move the valve stem 40 upward until it abuts the bottom of the flat disc valve 51. This differential of pressure is not great enough to overcome the biasing force of the spring 53. Consequently, flat disc valve 51 is not unseated from the annular valve seat 50. When the diaphragm 37 is deflected upward to move the valve stem 40 into contact with the bottom side of the flat disc valve 51, the spring 67 acting on the lower side of the flat disc valve 65 is rendered effective to move the valve 65 and the spool type valve 69 upward until the flat disc valve 65 contacts the annular valve seat 64 to close communication between the brake pipe and the chamber 36. Thus, when the brakes are completely released and the chambers 39 and 36 charged to the hereinbefore-mentioned preselected normal charged valve, the flat disc valve 51 will be seated on its seat 50 and the flat disc valve 65 will be seated on its seat 64, respectively.

INITIAL PARTIAL SERVICE APPLICATION OF BRAKES

To manually effect an initial partial service application of brakes on the train, the engineer will move the handle of the engineer's brake valve device on the locomotive arcuately from its "Release" position into its service zone to a position corresponding to the degree of the initial service application desired. When the handle of the engineer's brake valve device is moved into the service zone, the brake valve device operates to vent fluid under pressure from the brake pipe 1 to atmosphere until the pressure in the brake pipe 1 is reduced a corresponding degree.

As the pressure in the brake pipe 1 is reduced, the brake control valve device 3 operates in the usual well-known manner to effect an initial quick service reduction in brake pipe pressure and an initial partial service brake application on the freight car on which the brake control valve device 3 is installed, the degree of the partial service brake application corresponding to the degree of reduction of pressure effected in the brake pipe 1. The brake control valve device 3 then moves to a lap position.

Also, as the pressure in brake pipe 1 is reduced by flow therefrom to atmosphere via the engineer's brake valve device on the locomotive, fluid under pressure will flow at a rate controlled by the size of the choke 24 from the chamber 39 above the diaphragm 37 of the quick service valve device 8 to the brake pipe via the passageway 23, choke 24, passageway 35 in the nut 34, strainer device 33, chamber 32, passageway 15 and branch pipe 6, whereupon the quick service valve device 8 operates in the manner hereinbefore described in detail, to first effect the supply of fluid under pressure from the brake pipe to atmosphere and thereby provide a transmission wave of quick service reduction in brake pipe pressure serially from car to car through the train.

The initial quick service reduction in brake pipe pressure effected by flow from the brake pipe to atmosphere is effective to further reduce the pressure in the chamber 39 above the diaphragm 37, as hereinbefore explained. Therefore, the diaphragm 37 is deflected upward to cause the quick service valve mechanism 11 of the quick service valve device 8 to operate in the manner hereinbefore described in detail to unseat the annular valve seat 77 on the lower end of the spool valve 69 from the flat disc valve 65 and effect a corresponding reduction in the pressure in the chamber 36 and the quick service chamber 21 after which the annular valve seat 77 is reseated on the flat disc valve 65 which is biased at this time against the annular valve seat 64 by spring 67.

SUPPLEMENTAL SERVICE APPLICATION OF BRAKES

Let it be supposed that subsequent to effecting an initial partial service application of brakes on the train, the engineer desires to effect a supplemental service brake application to increase the degree of the service brake application on the train. To do so, he will move the handle of the engineer's brake valve device arcuately from the position it occupies in its service zone in a direction away from its "Release" position to another position in its service zone corresponding to the degree of service brake application now desired on the train. When the handle of the engineer's brake valve device is thus moved from one position in the service zone to another position in this zone further away from its "Release" position, the brake valve device operates to again vent fluid under pressure from the brake pipe 1 until the pressure therein is reduced a corresponding degree.

As the pressure in the brake pipe 1 is thus further reduced, the brake control valve device 3 operates in the usual well-known manner from its lap position to its service position to effect the supply of fluid under pressure from the auxiliary reservoir 4 to the brake cylinder device 6 to increase the degree of service brake application upon the freight car on which the brake control valve device is installed, the increase in the degree of the brake application corresponding to the reduction in pressure effected in the brake pipe 1 by movement of the handle of the engineer's brake valve device on the locomotive from one position in its service zone to another position in this zone further from the "Release" position of the handle. The brake control valve device 3 will move back to its lap position when brake cylinder pressure has increased an amount corresponding to the reduction of pressure effected in the brake pipe 1.

As the pressure in the brake pipe 1 is further reduced by moving the handle of the engineer's brake valve device from one position in its service zone to another position in this zone further away from its "Release" position, the pressure in the chamber 39 above the diaphragm 37 of the quick service valve device 8 is likewise reduced in the manner hereinbefore described, whereupon the quick service valve device 8 operates in response to the reduction in pressure in the chamber 39 to effect the supply of fluid under pressure from the brake pipe 1 to atmosphere to thereby provide another transmission wave of quick service reduction in brake pipe pressure serially from car to car through the train.

This second quick service reduction in brake pipe pressure effected by flow from the brake pipe 1 to atmosphere is effective to again further reduce the pressure in the chamber 39 above the diaphragm 37 of the quick service valve mechanism 11 whereupon the quick service valve mechanism 11 will operate in response to this reduction of pressure in the chamber 39 in the manner hereinbefore explained to effect a corresponding reduction in the pressure in the chamber 36 below the diaphragm 37 and in the quick service chamber 21 after which the parts of the quick service valve device 8 return to a lapped position in which the flat disc valve 51 is seated on the annular valve seat 50, and the flat disc valve 65 is seated on the annular valve seat 64 and the annular valve seat 77 on the lower end of the spool type valve 69 is in seating contact with the upper side of the flat disc valve 65.

From the above, it is apparent that the quick service valve device 8 is operative in response to each successive engineer's brake valve device effected reduction in brake pipe pressure to effect the supply of fluid under pressure from the brake pipe 1 to atmosphere to cause continual and successive quick service reduction in brake pipe pressure as the pressure in the brake pipe 1 is reduced from its preselected normal charged value to a pressure corresponding to a full service brake application.

Subsequent to effecting a partial or full service brake application, such a brake application can always be released by the engineer moving the handle of the engineer's brake valve device arcuately from whatever position it occupies in its application zone back to its "Release" position whereupon the engineer's brake valve device will effect the supply of fluid under pressure to the train brake pipe to charge the brake pipe to the hereinbefore-mentioned preselected normal charged value, it, of course, being understood that each brake control valve device 3 on the respective cars in the train operates in response to this charging of the train brake pipe to release the brakes on the car on which the respective brake control valve device 3 is installed.

DESCRIPTION—FIG. 2

Figure 2:
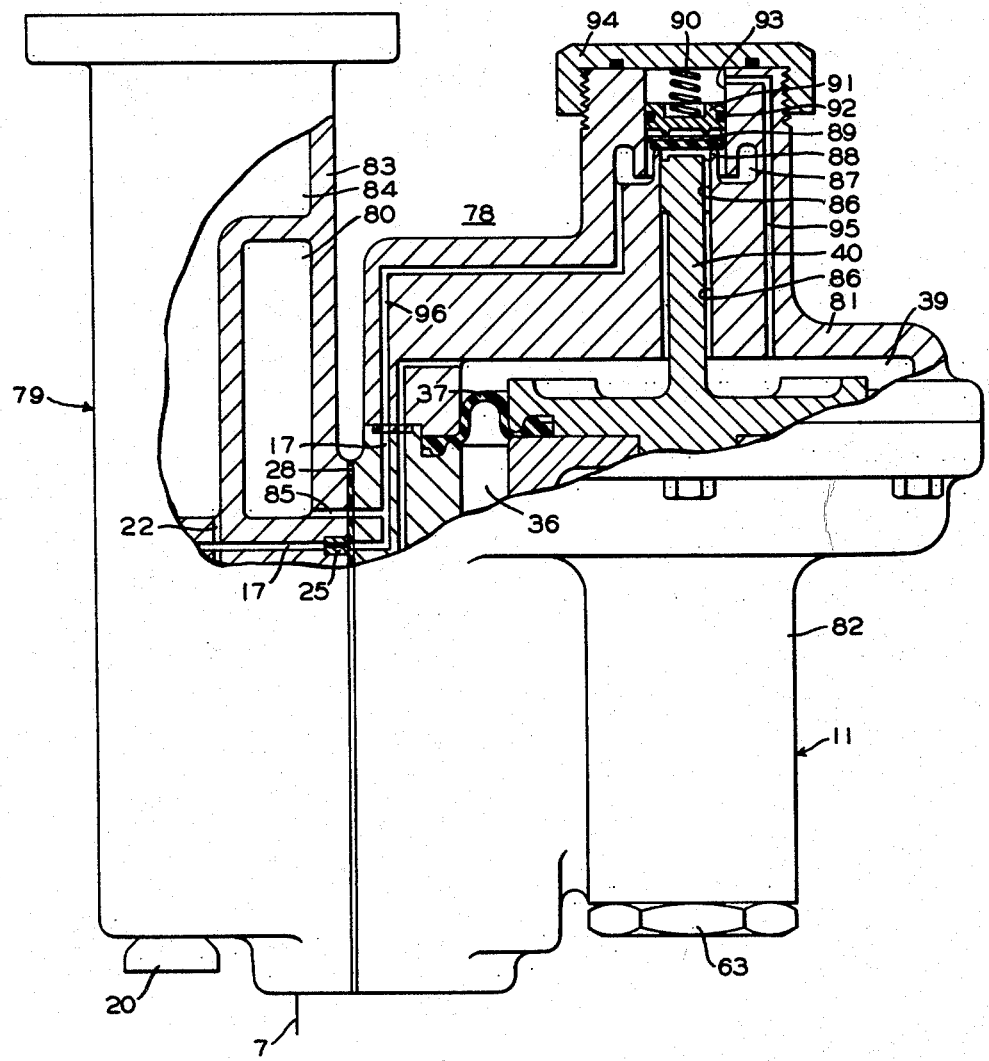
FIG. 2 is an elevational view, partly in section, of a novel quick service valve device constructed in accordance with a second embodiment of the invention.

FIG. 2 of the drawing shows a second embodiment of a quick service valve device 78 comprising the invention. Quick service valve device 78 is identical in construction to the quick service valve device 8 except a different pipe bracket portion 79 is provided that has formed therein a quick service volume 80, and the quick service valve mechanism 11 is provided with a cover member 81 and a casing 82 that differs in construction from the corresponding cover member 38 and casing 27 shown in FIG. 1.

Since the quick service valve devices 8 and 78 shown respectively in FIGS. 1 and 2 are identical in construction, except as pointed out above and hereinafter described in detail, for convenience, corresponding parts of the two quick service valve devices are identified by the same reference numerals without additional description.

The pipe bracket portion 79 of the quick service valve device 78 comprises a casing 83 having formed therein the quick service volume 80 and a quick service chamber 84, the combined volumes of the quick service volume 80 and the quick service chamber 84 being substantially equal to the volume of the quick service chamber 21 formed in the casing 12 of the quick service valve device 8 shown in FIG. 1. The passageway 22 in the casing 82 of the quick service valve mechanism 11 extends through the casing 83 of the pipe bracket portion 79 of the quick service valve device 78 and opens into the quick service chamber 84, and a passageway 85 that extends through the casings 82 and 83 is connected at one end to the passageway 17 in the casing 82 and opens at the opposite end into the quick service volume 80.

The cover member 81 differs from the cover member 38 in that it is provided with a bore 86 corresponding to the bore 45 in the cover member 38.

The upper end of the bore 86 opens into a chamber 87 in the cover member 81 and has formed thereon an annular valve seat 88 against which a flat disc valve 89 is normally biased by a spring 90 and fluid under pressure acting on a piston 91 provided with an O-ring seal 92 carried in a peripheral annular groove formed on the piston. The piston 91 is interposed between the flat disc valve 89 and the spring 90 and is slidably and sealably mounted in a bore 93 formed in the cover member 81 and extending from the exterior thereof into the chamber 87 therein. The upper end of the bore 93 is closed by a cup-shaped cap 94 that is provided with internal screw threads that have screw-threaded engagement with corresponding external screw threads formed on the upper end of the cover member 81.

The upper side of the piston 91 is subject to brake pipe pressure supplied thereto from the chamber 39 above the diaphragm 37 via a passageway 95 formed in the cover member 81, which passageway 95 opens at one end into the chamber 39 and at the opposite end at the wall surface of the bore 93 adjacent the upper end thereof.

The cover member 81 is provided with another passageway 96 that opens at one end into the chamber 87 and at the other end at the surface of the cover member 81 that abuts the casing 82 and is in alignment with the passageway 17 in the casing 82.

OPERATION—FIG. 2

*Initial charging*

Initial charging of the brake equipment on a car provided with a brake control valve device 3 and a quick service valve device 78 constructed as shown in FIG. 2 of the drawings is substantially the same as that of a car brake equipment comprising a brake control valve device 3 and a brake control valve device 8 constructed as shown in FIG. 1. Therefore, a detailed description of the operation of the brake control valve device 78 during initial charging is not deemed necessary. It will be noted, however, that the fluid under pressure supplied from the brake pipe 1 to the chamber 39 above the diaphragm 37 of the quick service valve device 78 flows from the chamber 39 to the interior of the bore 93 above the piston 91 via the passageway 95 in the cover member 81 so that the flat disc valve 89 is maintained in seating contact with the annular valve seat 88 by the difference in the combined forces of the spring 90 and the fluid at brake pipe pressure acting over the entire area of the upper side of the piston 91 and the force of the fluid at brake pipe pressure acting on the lower side of the piston over the area within the annular valve seat 88. Accordingly, when the flat disc valve 89 is unseated from the annular valve seat 88, the entire area of the lower side of the piston 91 will be subject to brake pipe pressure. Consequently, both sides of the piston 91 will be subject to the same fluid pressure so that, subsequent to the flat disc valve 89 being unseated by the valve stem 40 and diaphragm 37, the differential of pressure acting in an upward direction on the diaphragm 37 has to move the flat disc valve 89 upward against only the yielding resistance of the spring 90.

FULL SERVICE APPLICATION OF BRAKES

Assuming that the brake equipment on each freight car in a train of cars being hauled by a locomotive comprises the brake pipe 1, the brake control valve device 3, auxiliary reservoir 4, emergency reservoir 5, and brake cylinder device 6 shown in FIG. 1 of the drawings and the quick service valve device 78 shown in FIG. 2 connected by the branch pipe 7 to the brake pipe 1, let it be supposed that the engineer desires to effect a full service brake application on the train.

To manually effect a full service application of brakes on the train, the engineer will operate the engineer's brake valve device on the locomotive in the manner hereinbefore described to effect venting of fluid under pressure from the brake pipe 1 at a service rate until the pressure in the train brake pipe is reduced an amount corresponding to a full service application of brakes.

As the pressure in the brake pipe 1 is reduced at a service rate, the brake control valve device 3 on each car in the train operates in the usual well-known manner of railway freight car brake control valve devices to effect an initial quick service reduction in brake pipe pressure and a full service brake application on the respective freight car on which the brake control valve device 3 is installed.

Also, as the pressure in the brake pipe 1 is reduced by flow therefrom to atmosphere via the train brake pipe and the engineer's brake valve device on the locomotive, fluid under pressure will flow at a restricted rate from the chamber 39 above the diaphragm 37 of the quick service valve device 78 via the same pathway hereinbefore described in detail in connection with the quick service valve device 8 so that the pressure in the chamber 39 is reduced simultaneously as the pressure in the train brake pipe is reduced.

At the same time, fluid under pressure will flow at a slower or more restricted rate from the chamber 36 below the diaphragm 37 via the same pathway hereinbefore described in detail in connection with the quick service valve device 8. Consequently, a differential of pressure is established on the diaphragm 37 which deflects it in an upward direction until the upper end of the valve stem 40 is moved into contact with the bottom of the flat disc valve 89. As the diaphragm 37 continues to be deflected upward, the valve stem 40 effects unseating of the flat disc valve 89 from the annular valve seat 88. By unseating of the flat disc valve 89, fluid under pressure from the chamber 39 and the brake pipe, which is connected thereto via the same pathway hereinbefore described in detail, is permitted to flow to the quick service volume 80 via bore 86, thence past the now unseated flat disc valve 89 to the chamber 87 from whence it flows through passageways 96, 17 and 85 to the quick service volume 80.

The fluid under pressure supplied from the brake pipe 1 to the quick service volume 80, as explained above, flows therefrom to atmosphere via passageway 85, choke 25, passageway 17, exhaust chamber 16 and insect excluder device 20 at a rate determined by the size of the choke 25 until the supply of fluid under pressure to the quick service volume 80 is terminated by seating of the flat disc valve 89 on the annular valve seat 88 which occurs in response to operation of the quick service valve device 78 to vent fluid under pressure from the quick service chamber 84 and the chamber 36 below the diaphragm 37 in the same manner as has hereinbefore been described in detail for the quick service valve device 8. Thus, the quick service valve device 78 operates in response to a "Full Service" reduction in the pressure in the brake pipe 1 to quickly charge the quick service volume 80 from the brake pipe 1 to provide a transmission wave of quick service reduction in brake pipe pressure serially from car to car through the train.

RELEASE OF A FULL SERVICE APPLICATION OF BRAKES

When the engineer moves the handle of the engineer's brake valve device on the locomotive from its "Full Service" position arcuately back to its "Release" position, fluid under pressure will be supplied to the train brake pipe and thence to the brake control valve devices 3 on the cars in the train to cause them to operate in the usual well-known manner to effect a release of the brakes on the train.

Fluid under pressure supplied to the train brake pipe will flow to the chambers 36 and 39 on the opposite sides of the diaphragm 37 of the quick service valve device 78 as hereinbefore described in detail in connection with the quick service valve device 8 under initial charging to charge these chambers and also the quick service chamber 84 to the hereinbefore-mentioned preselected normal charged value. Consequently, the diaphragm 37 of the quick service valve device 78 will move to the position in which the end of valve stem 40 abuts the lower side of the flat disc valve 89 which is seated on the annular valve seat 88 by the combined forces of the spring 90 and brake pipe pressure acting on the upper side of the piston 91 supplied thereto from the chamber 39 via the passageway 95 and bore 93 in the cover member 81. The other valve members (not shown) of the quick service valve device 78 will now occupy the same position as the corresponding valve members of the quick service valve device 8 occupy while the brakes are released.

INITIAL PARTIAL SERVICE APPLICATION OF BRAKES

To manually effect an initial partial service application of brakes on the train, the engineer will operate the handle of the engineer's brake valve device on the locomotive in the manner hereinbefore described in connection with the quick service valve device 8 to effect a reduction in the pressure in the train brake pipe to a degree corresponding to the position to which the handle is moved in its service zone.

As the pressure in the train brake pipe is reduced, the brake control valve devices 3 on the cars in the train operate in the usual well-known manner of railway freight car brake control valve devices to effect an initial quick service reduction in brake pipe pressure and an initial partial service brake application on the cars in the train, the degree of the partial service brake application corresponding to the degree of reduction of pressure effected in the train brake pipe. The brake control valve devices 3 then move to a lap position.

Also, as the pressure in the train brake pipe is reduced by flow therefrom to atmosphere via the engineer's brake valve device on the locomotive, fluid under pressure will flow at a restricted rate from the chamber 39 above the diaphragm 37 of the quick service valve device 78 whereupon the diaphragm 37 is deflected upward in response to a differential of pressure established thereon in the manner hereinbefore described to effect, through the intermediary of the valve stem 40, unseating of the flat disc valve 89 from the annular valve seat 88 whereupon fluid under pressure flows from the brake pipe 1 and chamber 39 to the quick service volume 80 and atmosphere via the same pathway hereinbefore described to provide a transmission wave of quick service reduction in brake pipe pressure serially from car to car through the train.

Fluid under pressure flows from the brake pipe 1 and the chamber 39 above the diaphragm 37 of the quick service valve device 78 to the quick service volume 80 and atmosphere until the quick service valve device 78 operates in the same manner as hereinbefore described in connection with the quick service valve device 8 to vent fluid under pressure from the quick service chamber 84 and the chamber 36 below the diaphragm 37 to reduce the pressure in the chamber 36 below that in the chamber 39 to cause the diaphragm 37 to be deflected downward whereupon the valve stem 40 is moved downward to render spring 90 effective to seat the flat disc valve 89 on the annular valve seat 88 and thereby terminate quick service venting of fluid under pressure from the brake pipe 1 and the chamber 39 to the quick service volume 80, the pressure in the quick service volume 80 being reduced to atmospheric pressure after a period of time dependent upon the size of the choke 25.

SUPPLEMENTAL SERVICE APPLICATION OF BRAKES

Subsequent to effecting an initial partial service application of brakes on the train, the engineer may effect an increase in the degree of the service brake application by moving the handle of the engineer's brake valve device from the position it occupies in its service zone in a direction away from its "Release" position to another position in its service zone to effect a further reduction in the pressure in the train brake pipe until the pressure therein is reduced to a degree corresponding to the position to which the handle is moved in its service zone.

The brake control valve devices 3 on the cars in the train will now operate in the usual manner from their lap position to their service position and then back to their lap position to increase the degree of the service brake application on the freight cars in the train to a degree corresponding to the reduction in pressure effected in the train brake pipe.

The above-mentioned further reduction in the pressure in the brake pipe effected by manual operation of the engineer's brake valve device effects a corresponding reduction in the pressure in the chamber 39 above the diaphragm 37 of the quick service valve device 78 whereupon the quick service valve device 78 operates in the manner hereinbefore described to first vent fluid under pressure from the brake pipe 1 and the chamber 39 to the quick service volume 80 and atmosphere and then to vent fluid under pressure from the quick service chamber 84 and chamber 36 below the diaphragm 37 to atmosphere to cause the quick service valve device 78 to operate to terminate venting of fluid under pressure from the brake pipe 1 and the chamber 39 to the quick service volume 80 and atmosphere.

From the above, it is apparent that the quick service valve device 78 is operative in response to each successive engineer's brake valve device effected reduction in brake pipe pressure to effect the supply of fluid under pressure from the brake pipe 1 to the quick service volume 8 and to atmosphere to cause continual and successive quick service reductions in brake pipe pressure as the pressure in the brake pipe 1 is reduced from its preselected normal charged value to a pressure corresponding to the full service brake application.

Subsequent to effecting a partial or full service brake application, such a brake application can always be released by the engineer moving the handle of the engineer's brake valve device arcuately from whatever position it occupies in its application zone back to its "Release" position, whereupon the engineer's brake valve device will effect the supply of fluid under pressure to the train brake pipe to charge the brake pipe 1 to the hereinbefore-mentioned preselected normal charged value, it, of course, being understood that each brake control valve device 3 on the respective cars in the train operates in the usual manner in response to this charging of the train brake pipe to release the brakes on the car on which the respective brake control valve device is installed.

It will be understood that charging of the train brake pipe to the hereinbefore-mentioned preselected normal charged value effects charging of the chamber 39 above the diaphragm 37 of the quick service valve device 78 so that the diaphragm 37 and the valve stem 40 will be moved to such a position, if not already in this position, that the spring 90 effects seating of the flat disc valve 89 on the annular valve seat 88 if the valve 89 has not already been seated.

It may be noted that the chokes 24 and 25 may be omitted from both the quick service valve device 8 and the quick service valve device 78 if so desired. It will be apparent that by removing the chokes 24 and 25, a more rapid rate of flow from the brake pipe to atmosphere can be obtained. In connection with the quick service valve device 8, it will be noted that the choke 55 insures that the rate of flow of fluid under pressure from the brake pipe to atmosphere will be at such a rate as to prevent an emergency brake application. In other words, the size of the choke 55 is such as to insure that the rate of flow of fluid under pressure from the brake pipe to atmosphere is less than an emergency rate.

It may be noted that when an emergency application of the brakes is effected, the quick service valve device 8 or 78, whichever is installed on a freight car, will operate in the same manner as hereinbefore described for effecting a service application of the brakes. However, when an emergency application of brake is effected, the pressure in the brake pipe is reduced to zero at such a rapid rate that the quick service valve device 8 or 78 vents a comparably small quantity of air from the brake pipe during an emergency application of the brakes.

Having now described the invention, what I claim as new and desire to secure by Letters Patent is:

1. A quick service valve device for a railway vehicle brake system operative in response to variations in pressure in a normally charged brake pipe, said quick service valve device comprising:
   (a) a casing having formed therein a quick service chamber,
   (b) a movable abutment supported by said casing and subject on one side to pressure in the brake pipe and on the opposite side to pressure in the quick service chamber,
   (c) first valve means operative upon movement of said movable abutment in one direction responsively to a reduction in pressure in the brake pipe to effect venting of fluid under pressure from said one side of said movable abutment and from the brake pipe to atmosphere,
   (d) second valve means, and
   (e) means providing a lost motion connection between said movable abutment and said second valve means to render said second valve means operative by said movable abutment after said first valve means is operated thereby to initiate said venting, to effect venting of fluid under pressure from said opposite side of said movable abutment and from the quick service chamber to atmosphere to cause said movable abutment to thereafter shift in the opposite direction to operate said first valve means to terminate said venting of fluid under pressure from said one side of said movable abutment and from the brake pipe to atmosphere, whereby said movable abutment is rendered effective to operate said second valve means, after said first valve means has terminated said venting, to terminate the venting of fluid under pressure from said opposite side of said movable abutment and from the quick service chamber to atmosphere.

2. A quick service valve device for a railway vehicle brake system, as claimed in claim 1, further characterized by a quick service volume formed in said casing for receiving fluid under pressure vented from said one side of said movable abutment and from the brake pipe by said first valve means.

3. A quick service valve device for a railway vehicle brake system operative in response to variation in pressure in a normally charged brake pipe, said quick service valve device comprising:
   (a) a casing having formed therein a quick service chamber,
   (b) a movable abutment supported by said casing and subject on one side to pressure in the brake pipe and on the opposite side to pressure in the quick service chamber,
   (c) first valve means operative upon movement of said movable abutment in one direction responsively to an operator-initiated reduction in pressure in the brake pipe to effect venting of fluid under pressure from said one side of said movable abutment and from said brake pipe to atmosphere, and (d) second valve means which establishes communication by which fluid under pressure is supplied from the brake pipe to charge said quick service chamber and operative upon movement of said movable abutment in said one direction, prior to operation of said first valve means to vent fluid under pressure from the brake pipe, to cut off said charging communication to the quick service chamber and operative, subsequent to cutting off of said charging communication, to effect venting of fluid under pressure from said opposite side of said movable abutment and from the quick service chamber to atmosphere thereby to cause movement of said movable abutment reversely in a direction opposite the said one direction to first cause said first valve means to operate to terminate said venting of fluid under pressure from said one side of said movable abutment and from said brake pipe to atmosphere, and thereafter to cause operation of said second valve means to terminate said venting of fluid under pressure from said opposite side of said movable abutment and from the quick service chamber to atmosphere.

4. A quick service valve device for a railway vehicle brake system as claimed in claim 1, further characterized in that said first valve means comprises:
 (a) an annular valve seat formed on said casing,
 (b) a flat disc type valve,
 (c) a spring for biasing said flat disc type valve into contact with said annular valve seat formed on said casing, and
 (d) a valve stem operatively connected to said movable abutment and operative upon movement of said movable abutment in said one direction to effect unseating of said flat disc type valve from said annular valve seat to thereby establish a communication between said one side of said movable abutment and the brake pipe and atmosphere through which fluid under pressure flows from said one side of said movable abutment and the brake pipe until said second valve means effects venting of fluid under pressure from said opposite side of said movable abutment for a time sufficient to cause the pressure thereon to be reduced below the pressure on said one side to establish a differential of pressure on said movable abutment to move it in a direction to render said spring means effective to seat said flat disc type valve on said annular valve seat to terminate venting of fluid under pressure from said one side of said abutment and the brake pipe to atmosphere.

5. A quick service valve device for a railway vehicle brake system as claimed in claim 1, further characterized in that said second valve means comprises:
 (a) a spool type valve having at one end a stem provided with a bore the axis of which is at a right angle to the axis of the stem and at the opposite end an annular exhaust valve seat formed at the end of a counterbore extending inward from said opposite end and opening at the surface of a peripheral annular groove formed on the spool type valve intermediate the ends thereof,
 (b) an annular supply valve seat formed on said casing,
 (c) a flat disc type valve,
 (d) a spring for biasing said flat disc type valve into contact with only said annular exhaust valve seat in a first position of said spool type valve, into contact with both of said annular valve seats in a second position of said spool type valve, and into contact with only said annular supply valve seat in a third position of said spool type valve, and
 (e) a pin having its ends anchored in said movable abutment and extending through the bore in the stem of said spool type valve, the diameter of said pin being a chosen amount less than that of the bore whereby said first valve means is rendered effective to vent fluid under pressure from the brake pipe to atmosphere prior to movement of said spool type valve from its second position to its third position to effect venting of fluid under pressure from the quick service chamber to atmosphere, and whereby said first valve means is rendered effective to terminate venting of fluid under pressure from the brake pipe to atmosphere prior to movement of said spool type valve from its third position to its second position to terminate venting of fluid under pressure from the quick service chamber to atmosphere.

6. A quick service valve device for a railway vehicle brake system as claimed in claim 1, further characterized in that said first valve means comprises:
 (a) an annular vent valve seat formed on said casing,
 (b) a first flat disc type valve,
 (c) a spring for biasing said flat disc type valve into contact with said annular vent valve seat formed on said casing,
 (d) a valve stem operatively connected to said movable abutment and operative upon movement of said movable abutment in said one direction to effect unseating of said flat disc type valve from said annular vent valve seat to thereby establish a communication from said one side of said movable abutment and the brake pipe to atmosphere through which fluid under pressure flows from said one side of said movable abutment and the brake pipe until said second valve means effects venting of fluid under pressure from said opposite side of said movable abutment until the pressure therein is reduced below the pressure on said one side to establish a differential of pressure on said movable abutment to move it in a direction to render said spring means effective to seat said flat disc type valve on said annular vent valve seat to terminate venting of fluid under pressure from said one side of said abutment and said brake pipe to atmosphere, and in that second valve means comprises:
 (e) a spool type valve having at one end a stem provided with a bore the axis of which is at a right angle to the axis of the stem and at the opposite end an annular exhaust valve seat formed at the end of a counterbore extending inward from said opposite end and opening at the surface of a peripheral annular groove formed on the school type valve intermediate the ends thereof,
 (f) an annular supply valve seat formed on said casing,
 (g) a second flat disc type valve,
 (h) a spring for biasing said second flat disc type valve into contact with only said annular exhaust valve seat on said spool type valve in a first position thereof, into contact with both said annular exhaust valve seats on said spool type valve and said second annular supply valve seat formed on said casing in a second position of said spool type valve, and into contact with only said second annular supply valve seat in a third position of said spool type valve, and
 (i) a pin having its ends anchored in said movable abutment and extending through the bore in the stem of said spool type valve, the diameter of said pin being a chosen amount less than that of the bore whereby said first valve means is rendered effective to vent fluid under pressure from the brake pipe to atmosphere prior to movement of said spool type valve from its second position to its third position to effect venting of fluid under pressure from the quick service chamber to atmosphere, and whereby said first valve means is rendered effective to terminate venting of fluid under pressure from the brake pipe to atmosphere prior to movement of said spool type valve from its third position to its second position to terminate venting of fluid under pressure from the quick service chamber to atmosphere.

7. A quick service valve device for a railway vehicle brake system as claimed in claim 1, further characterized in that said second valve means comprises:
 (a) two concentric annular valve seats, the first of which is formed on said casing and the second of which is operably connected to said movable abutment through a lost-motion connection and movable thereby with respect to the first annular valve seat,
 (b) a flat disc type valve, and
 (c) a spring for biasing said flat disc type valve into contact with only said movable annular valve seat in a first position thereof, into contact with both of said annular valve seats in a second position of said movable annular valve seat, and into contact with only the first annular valve seat in a third position of said movable annular valve seat.

8. A quick service valve device for a railway vehicle brake system having a brake pipe charged to certain normal pressure variations of which control application and release of the vehicle brakes, said quick service valve device comprising:
 (a) a casing,
 (b) an abutment for movement in the casing responsively to the differential of pressures in a first and a second chamber located respectively on opposite sides thereof,
 (c) a quick service chamber in said casing in constant communication with said second chamber,
 (d) passage means via which to charge said first and second chambers and said quick service chamber with fluid pressure from the brake pipe to subject said abutment to the opposing pressures in said first and second chambers,
 (e) a first valve means normally closing a communication between said first chamber and atmosphere and operative by said abutment to open said communication to vent the said first chamber and thereby the brake pipe to atmosphere responsively to movement of said abutment in one direction as a result of an operator-initiated reduction of pressure in the brake pipe,
 (f) a second valve means operatively connected to said abutment through a lost-motion connection and which opens said passage means to cause the quick service chamber and said second chamber to be charged from the brake pipe, said second valve means being operative by said abutment upon equalization of pressures in said first and second chambers to close the charging communication for the quick service chamber, and being operative by said abutment, after said first valve means is opened to vent the said first chamber, to open a communication via which to vent fluid under pressure from said quick service chamber and said second chamber,
 (g) choke means restricting the venting of fluid pressure from the quick service chamber to such a rate as to insure venting of brake pipe pressure by said first valve means for a certain predetermined time before the reduction of pressure in said quick service chamber and connected second chamber relative to the pressure in the first chamber is sufficient to cause a reversed direction of movement of said abutment, and
 (h) said abutment being effective upon initial movement in the reversed direction to cause operation of said first valve means to terminate further venting of pressure from the brake pipe and, upon further movement of the abutment in the reversed direction, to operate said second valve means to terminate further venting of the quick service chamber and second chamber.

9. A quick service valve device for a railway vehicle brake system as claimed in claim 8, further characterized by choke means which control the rate of venting of fluid under pressure from the brake pipe by said first valve means, said two choke means functioning jointly to determine the length of time that fluid under pressure is vented from said one side of said movable abutment and from the brake pipe to atmosphere.

10. A quick service valve device as claimed in claim 1, further characterized by:
 (a) a quick service volume formed in said casing,
 (b) choke means via which said quick service volume communicates with atmosphere, and
 (c) said first valve means being effective when operated in response to movement of said movable abutment in said one direction to effect venting of fluid under pressure from said one side of the movable abutment and from the brake pipe to said quick service volume from which it flows to atmosphere at a restricted rate via said choke means.

11. A quick service valve device for a railway vehicle brake system as claimed in claim 10, further characterized by a second choke means via which said quick service chamber is vented to atmosphere under control of said second valve means, said two choke means functioning jointly to determine the length of time that fluid under pressure is vented from said one side of said movable abutment and from the brake pipe to the quick service volume and atmosphere.

References Cited by the Examiner
UNITED STATES PATENTS 2,016,411 10/35 Cook _____ 303—83
2,137,018 11/38 Hewitt _____ 303—81

ARTHUR L. LA POINT, *Primary Examiner.*

EUGENE G. BOTZ, *Examiner.*